March 23, 1954
G. W. LEIMAN
2,672,950
GAS AND OIL SEPARATOR
Filed July 3, 1951
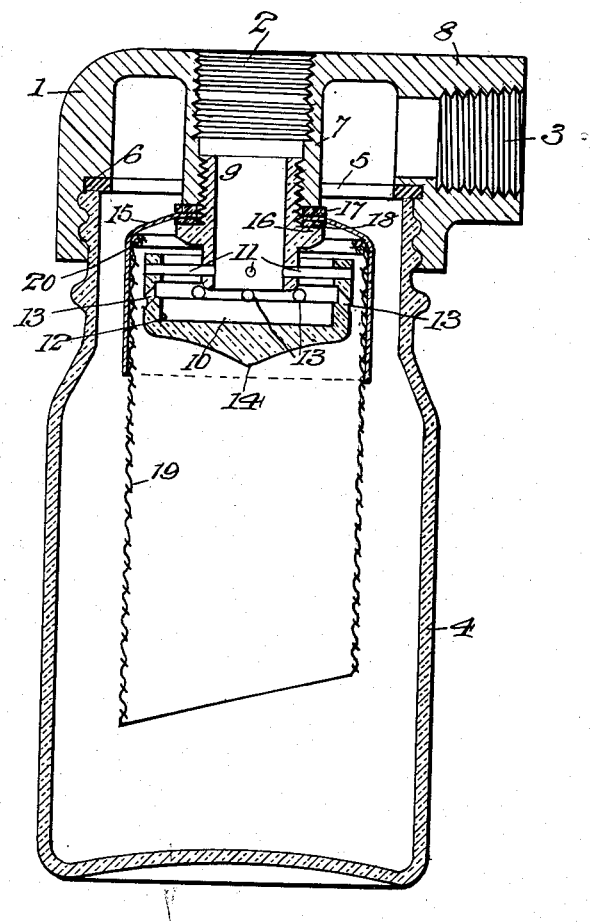
INVENTOR.
George W Leiman
BY
Attorneys Patented Mar. 23, 1954

2,672,950

UNITED STATES PATENT OFFICE 2,672,950

GAS AND OIL SEPARATOR

George W. Leiman, Denville, N. J., assignor to Leiman Bros., Inc., Newark, N. J., a corporation of New Jersey Application July 3, 1951, Serial No. 234,945

7 Claims. (Cl. 183—73)

My invention is directed to oil separators for use in oil-laden compressed air lines.

The object of my invention is to provide an oil separator particularly well adapted for use in low pressure air lines and which will be capable of thoroughly removing the oil from the air by providing primary and secondary oil separation, so that any oil which may be left in the air after the primary oil separation will be removed by the secondary oil separation.

With the above object in view, my invention comprises a hollow casing provided with an inlet for the oil-laden compressed air, a receptacle for receiving the finally separated oil, an outlet for the oil-free air, and primary and secondary oil separating devices interposed between the said inlet and outlet.

My invention more particularly includes an oil separation cup located beneath the air inlet for separating as much as possible of the oil from the compressed air, and a screen surrounding the cup for removing the balance of the oil, if any, from the air as it passes to the outlet.

A practical embodiment of my invention is represented in the accompanying drawing in which the oil separator is represented in vertical central section.

The hollow casing 1 of the oil separator is shown as provided with a vertically disposed inlet 2 for the oil-laden compressed air, and a laterally disposed outlet 3 for the oil-free compressed air, the bottom of the casing being open and threaded for the removable attachment thereto of the upper end of a jar or other suitable receptacle 4 in position to receive the oil which has been separated from the oil-laden compressed air. A washer 5 may be interposed between the top of the said receptacle and an annular shoulder 6 on the casing 1.

The inlet 2 for the oil-laden compressed air is provided for by the provision of a hollow lug 7 depending from the top of the casing 1, and the outlet 3 for the oil-free air is provided for by the provision of a hollow lug 8 projecting laterally from the casing 1.

A discharge nozzle 9 for the oil-laden compressed air is removably attached to the lower end of the hollow depending lug 7, as by having a threaded engagement therewith.

An oil separating cup 10 is attached to the lower end of the nozzle 9 as by cross-rods 11, with the bottom and uprising sides of the cup spaced from said nozzle. The uprising sides of the cup are shown as having an interior annular groove 12, from which an annular series of holes 13 lead outwardly and downwardly to the exterior of the cup.

The outer bottom wall of the cup 10 may be tapered toward its center to form a tip 14 for causing the oil, which flows downwardly from the holes 13 along the outer walls of the sides of the cup and the bottom of the cup, to drop into the removable receptacle 4.

A cap 15 has a central hole through its top, the edges of which hole are secured between an outer annular flange 16 on the nozzle 9 and the lower end of the depending lug 7. Washers 17 and 18 may be interposed between the edges of the cap and the depending lug and annular flange respectively. This cap 15 surrounds and is spaced from the cup 10 and lower end of the discharge nozzle 7.

The upper end of a tubular screen 19 is inserted into the cap and may be secured thereto as by a ring 20. This tubular screen extends downwardly a considerable distance within the removable receptacle 4, below the bottoms of the cup 10 and the cap 15. The bottom of the screen may be tapered to facilitate the dripping of the oil from one point of the screen onto the bottom of the said receptacle 4.

In operation, the oil-laden compressed air passes downwardly through the inlet 2 and nozzle 9 into the cup 10, where the greater part of the oil will be separated from the air. When sufficient oil has been accumulated in the cup, the oil will be forced by the pressure of the air outwardly into the annular groove 12 in the inner side walls of the cup, and then outwardly through the holes 13 to the outside of the cup, where the oil will drip down along the outer side and bottom walls of the cup until the oil drops from the tip 14 onto the bottom of the receptacle 4. The air then passes upwardly and outwardly over the top of the cup 10, then downwardly and outwardly through the tubular screen 19, so that any oil which may have been left in the air is collected on the screen and drips downwardly along the same to the bottom of the screen, where the oil will drop onto the bottom of the receptacle 4. The oil-free air then passes upwardly into the casing 1 and outwardly through the outlet 3.

It will thus be seen that the major portion of the oil is removed by the cup and the remaining oil by the screen, thus ensuring a complete separation of the oil from the air.

It is evident that various slight changes may be made in the construction, form and arrangement of the several parts, without departing from the spirit and scope of my invention.

What I claim is:

1. In an oil separator, a hollow casing having depending sides and an open bottom, a portable oil receptacle removably attached to said depending sides, a hollow lug depending from the top of said casing to provide an oil-laden compressed air inlet, another hollow lug projecting laterally from said casing to provide an oil-free air outlet, a discharge nozzle depending from said depending hollow lug, the bottom of the nozzle being open, an oil separating cup secured to the nozzle with the bottom of the cup spaced from the bottom of the nozzle and the uprising sides of the cup overlapping and spaced from the sides of the nozzle, an imperforate cap having its top secured between the nozzle and the said hollow depending lug, the depending sides of the cap overlapping and spaced from the uprising sides of the cup, and a foraminous tubular screen depending from said cap.

2. An oil separator as set forth in claim 1, in which the depending and laterally projecting hollow lugs are formed integral with the casing.

3. An oil separator as set forth in claim 1, in which the nozzle has a threaded engagement with the depending lug of the casing.

4. An oil separator as set forth in claim 1, in which the oil receptacle has a threaded engagement with the depending sides of the casing.

5. An oil separator as set forth in claim 1, in which the nozzle is provided with an exterior annular flange, and the top of the cap is secured in position between said flange and the bottom of the hollow depending lug of the casing.

6. An oil separator as set forth in claim 1, in which the uprising sides of the cup have an annular series of holes directed toward the depending sides of the cap.

7. An oil separator as set forth in claim 1, in which an interior annular groove is provided around the uprising sides of the cup, from which groove an annular series of holes lead outwardly and downwardly toward the depending sides of the cap.

GEORGE W. LEIMAN.

References Cited in the file of this patent

UNITED STATES PATENTS

| Number | Name | Date |
|---|---|---|
| 1,463,990 | Wilson | Aug. 7, 1923 |
| 1,468,906 | Inman | Sept. 25, 1923 |
| 1,839,379 | Downing | Jan. 5, 1932 |
| 2,170,074 | Hewitt | Aug. 22, 1939 |
| 2,467,408 | Semon | Apr. 19, 1949 |

FOREIGN PATENTS

| Number | Country | Date |
|---|---|---|
| 142,250 | Austria | June 25, 1935 |